United States Patent
Amimoto

(10) Patent No.: US 7,555,400 B2
(45) Date of Patent: Jun. 30, 2009

(54) MONITOR SYSTEM, TRANSMITTING APPARATUS AND MONITOR METHOD

(75) Inventor: Masanao Amimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 786 days.

(21) Appl. No.: 11/157,821

(22) Filed: Jun. 22, 2005

(65) Prior Publication Data

US 2005/0280863 A1    Dec. 22, 2005

(30) Foreign Application Priority Data

Jun. 22, 2004   (JP)   ............ 2004-183530

(51) Int. Cl.
*G01M 19/00*   (2006.01)
(52) U.S. Cl. ............ 702/122; 345/738; 455/404.1; 705/7; 715/205
(58) Field of Classification Search ............ 702/122, 702/123; 709/217, 231; 705/7, 26, 27; 455/404.1; 358/1.15; 707/200
See application file for complete search history.

(56) References Cited

U.S. PATENT DOCUMENTS

| | | | | |
|---|---|---|---|---|
| 6,108,637 A | * | 8/2000 | Blumenau | 705/7 |
| 6,801,763 B2 | * | 10/2004 | Elsey et al. | 455/404.1 |
| 7,437,660 B1 | * | 10/2008 | Mehta et al. | 715/205 |
| 2004/0080528 A1 | * | 4/2004 | Rand et al. | 345/738 |

FOREIGN PATENT DOCUMENTS

JP    2003-228528    8/2003

OTHER PUBLICATIONS

JP 2003228528 A (Yanagi ), Publication Date: Aug. 15, 2003, English translation.*

* cited by examiner

*Primary Examiner*—John H Le
(74) *Attorney, Agent, or Firm*—Young & Thompson

(57) ABSTRACT

A pseudo-file system and a WEB server faculty are installed in a transmitting apparatus retaining no file system. A control terminal that monitors this transmitting apparatus has a configuration in which a general-purpose WEB browser is used for monitor and control.

4 Claims, 8 Drawing Sheets

FIG. 4

| HTML FILE NAME | FIXED/ VARIABLE | EXISTENCE OF ISSUING COMMAND |
|---|---|---|
| HTML FILE 1 | FIXED | NO |
| HTML FILE 2 | VARIABLE | COMMAND 2 |
| HTML FILE 3 | VARIABLE | COMMAND 3 |
|  |  |  |
| ⋮ | ⋮ | ⋮ |
| HTML FILE n | FIXED OR VARIABLE | COMMAND n |

FIG. 5

| HTML FILE PASS NAME | HTML FILE NAME | HTML FILE POINTER |
|---|---|---|
| PASS 1 | FILE 1 | POINTER ADDRESS 1 |
| PASS 2 | FILE 2 | POINTER ADDRESS 2 |
| PASS 3 | FILE 3 | POINTER ADDRESS 3 |
|  |  |  |
| ⋮ | ⋮ | ⋮ |
| PASS n | FILE n | POINTER ADDRESS n |

MONITOR SYSTEM, TRANSMITTING APPARATUS AND MONITOR METHOD

BACKGROUND OF THE INVENTION

The present invention relates to a technology for monitoring a transmitting apparatus, and more particularly to a technology of employing a WEB browser, thereby to monitor a transmitting apparatus.

As a rule, in a transmitting apparatus for transmitting data, it is essential to monitor an operational situation of each section, a circuit, a module, etc. configuring an apparatus. Conventionally, various technologies on the exclusive monitor apparatus have been provided (for example, Patent Document 1).

The Patent Document 1 relates to a technology for packaging a WEB server faculty in the transmitting apparatus, being an apparatus to be monitored, so that the monitor and the control of the transmitting apparatus can be enabled in a general-purpose terminal such as a PC (Personal Computer).

[Patent Document 1]

JP-P2003-228528A

The technology of the Patent Document 1, however, cannot apply for the transmitting apparatus having no file system packaged. This reason is that packaging the WEB server faculty in the transmitting apparatus requires that the file system be beforehand packaged in the transmitting apparatus because an HTTP (Hyper Text Transfer Protocol) to be used for the WEB server, which is provided in an embedded OS (Operating system) of a general-purpose PC, is prepared on the premise that the file system is packaged.

The actual transmitting apparatus, in particular, the basic transmitting apparatus is required for a write performance of operational management data, so no file system is packaged in the transmitting apparatus. For this, the HTTP to be used for the WEB server is not also supported.

SUMMARY OF THE INVENTION

Thereupon, the present invention has been accomplished in consideration of the above-mentioned problems, and an object thereof is to lie in that installing a pseudo-file system and a WEB server faculty in a transmitting apparatus having no file system packaged enables the monitor and the control of the transmitting apparatus with a general-purpose PC.

A first invention for solving the above-mentioned problems is a monitor system to be configured of a transmitting apparatus retaining no file system and a terminal monitoring this transmitting apparatus, wherein said terminal has a controller for, for requesting transfer of a file for displaying monitor information, transmitting a transfer request, and causing monitor information transmitted responding to this transfer request to be displayed, said transfer request being comprised of a file name and a file pass name of its file, and wherein said transmitting apparatus has a retriever for retrieving a pointer indicating a location having this file filed, based upon the file name and the file pass name of the transfer request transmitted from said terminal, retrieving a file based upon the retrieved pointer, and issuing a command that corresponds to this retrieved file, an executor for executing said issued command, thereby to acquire monitor information, and a transmitter for inserting said acquired monitor information into said retrieved file, thereby to generate a file, and transmitting it.

A second invention for solving the above-mentioned problems is characterized in that in the above-mentioned first invention, said retriever retrieves said command from a filer having said file and said command stored correspondingly.

A third invention for solving the above-mentioned problems is characterized in that in the above-mentioned first invention, said retriever retrieves said command from an index table having said file name, said file pass name, said pointer, and said command stored correspondingly.

A fourth invention for solving the above-mentioned problems is a transmitting apparatus retaining no file system that is characterized in having a retriever for, based upon a file name and a file pass name of a transfer request for requesting transfer of a file for displaying monitor information, retrieving a pointer indicating a location having this file filed, retrieving a corresponding file based upon the retrieved pointer, and issuing a command that corresponds to this retrieved file, an executor for executing said issued command, thereby to acquire monitor information, and a transmitter for inserting said acquired monitor information into said retrieved file, thereby to generate a file, and transmitting it.

A fifth invention for solving the above-mentioned problems is characterized in that in the above-mentioned fourth invention, said retriever retrieves said command from a filer having said file and said command stored correspondingly.

A sixth invention for solving the above-mentioned problems is characterized in that in the above-mentioned fourth invention, said retriever retrieves said command from an index table having said file name, said file pass name, said pointer, and said command stored correspondingly.

A seventh invention for solving the above-mentioned problems is a monitor method of a monitor system to be comprised of a transmitting apparatus retaining no file system and a terminal monitoring this transmitting apparatus that is characterized in having a transfer request transmitting step of, for requesting transfer of a file for displaying monitor information of a transmitting apparatus, transmitting a transfer request, said transfer request being comprised of a file name and a file pass name of its file, a pointer retrieving step of, based upon the file name and the file pass name of said transmitted transfer request, retrieving a pointer indicating a location having this file filed, a file retrieving step of retrieving a file based upon said retrieved pointer, an issuing step of issuing a command that corresponds to said retrieved file, an executing step of executing said issued command, thereby to acquire monitor information, and a transmitting step of inserting said acquired monitor information into said retrieved file, thereby to generate a file, and transmitting it.

An eighth invention for solving the above-mentioned problems is a monitor method of monitoring a transmitting apparatus retaining no file system that is characterized in having a retrieving step of, based upon a file name and a file pass name of a transfer request for requesting transfer of a file for displaying monitor information, retrieving a pointer indicating a location having this file filed, retrieving a corresponding file based upon the retrieved pointer, and issuing a command that corresponds to this retrieved file, an executing step of executing said issued command, thereby to acquire monitor information, and a transmitting step of inserting said acquired monitor information into said retrieved file, thereby to generate a file, and transmitting it.

A ninth invention for solving the above-mentioned problems is characterized in that in the above-mentioned eighth invention, said retrieving step is a step of retrieving said command from a filer having said file and said command stored correspondingly.

A tenth invention for solving the above-mentioned problems is characterized in that in the above-mentioned seventh and eighth invention, said retrieving step is a step of retrieving said command from an index table having said file name, said file pass name, said pointer, and said command stored correspondingly.

An eleventh invention for solving the above-mentioned problems is a monitor system having a transmitting apparatus retaining no file system and a monitor terminal monitoring this transmitting apparatus that is characterized in that said transmitting apparatus has a communicator for making communication with said monitor terminal by employing an HTTP, and a WEB server faculty for collecting monitor information.

A twelfth invention for solving the above-mentioned problems is a transmitting apparatus retaining no file system that is characterized in having a communicator for making communication by employing an HTTP, and a WEB server faculty for collecting monitor information.

BRIEF DESCRIPTION OF THE DRAWING

This and other objects, features and advantages of the present invention will become apparent upon a reading of the following detailed description and a drawing, in which

FIG. 4 is a configuration view of an HTML file table;

FIG. 5 is a configuration view of an HTML index;

DESCRIPTION OF THE EMBODIMENTS

Figure 1:
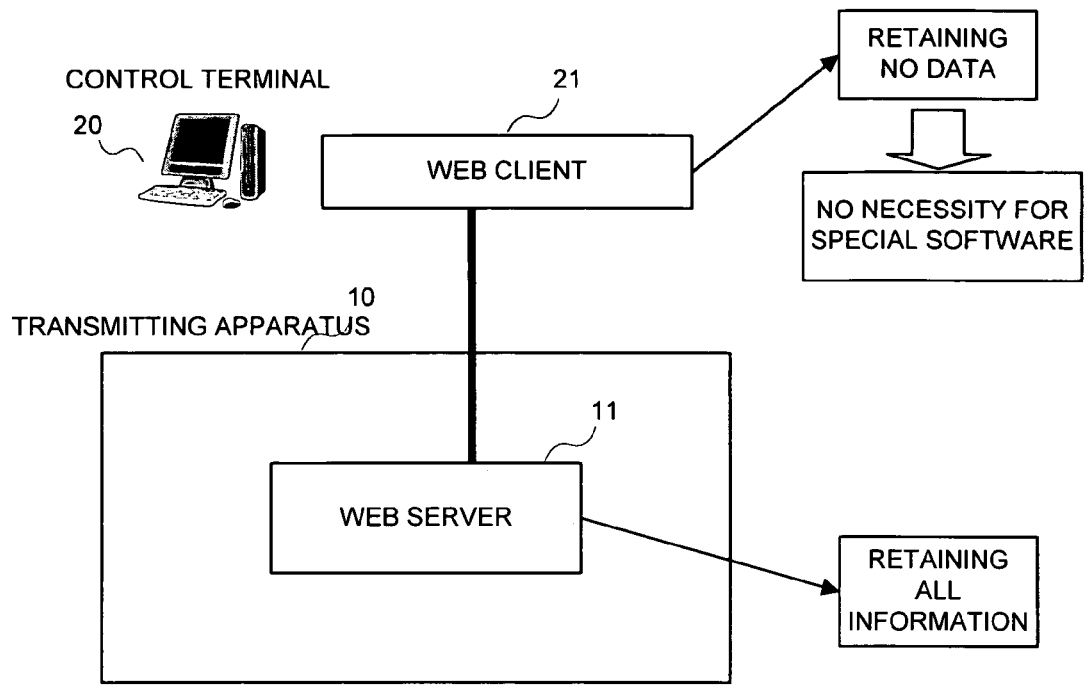
FIG. 1 is a conceptual view illustrating a relation between a WEB client and a WEB server.

In realizing a WEB server faculty in a monitor system, so as to cause a WEB client, being a monitor, not to package special software, all faculties for realizing the WEB server faculty should be packaged in a transmitting apparatus, being an object of monitor (FIG. 1). The present invention causes a pseudo-file system and a WEB server faculty to be installed in a basic transmitting apparatus retaining no file system. A control terminal that monitors this transmitting apparatus assumes a configuration in which a general-purpose WEB browser is used for monitor or control.

A first embodiment in the present invention will be explained.

Figure 2:
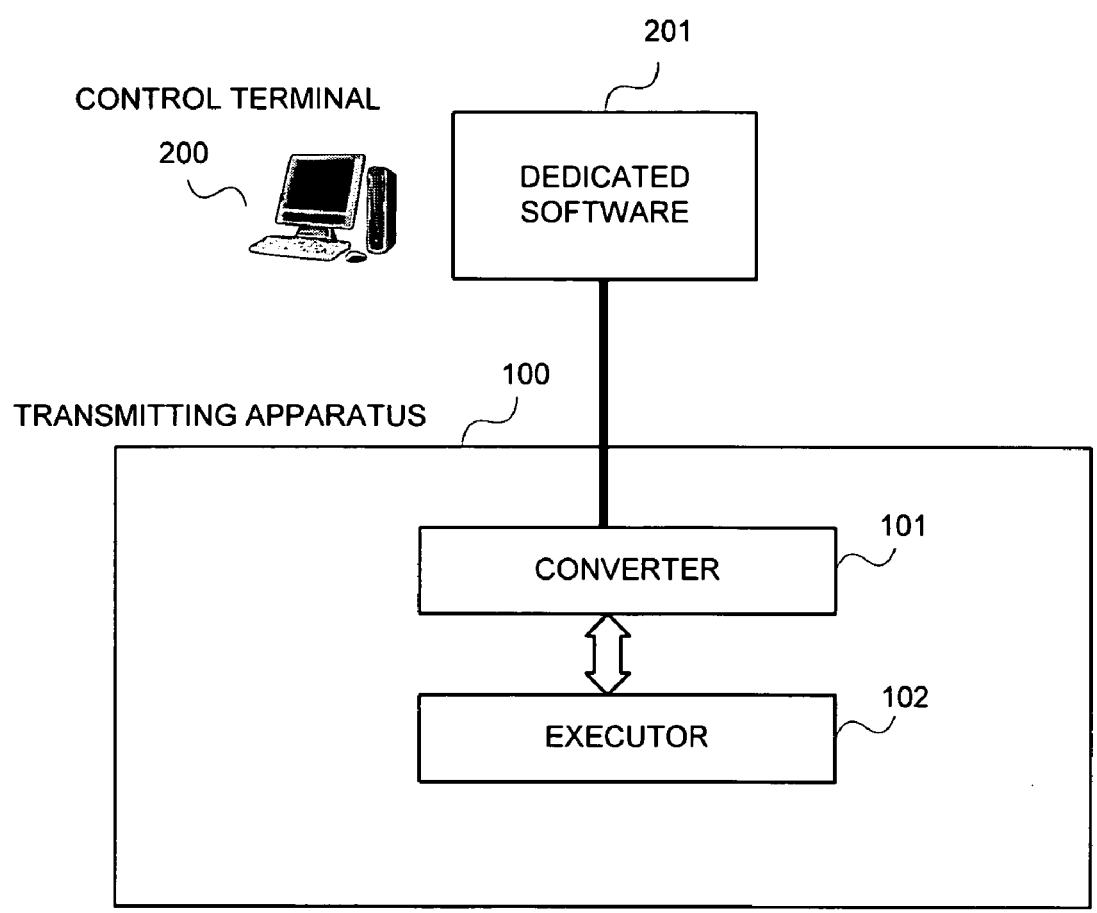
FIG. 2 is a conceptual view illustrating a relation between dedicated software and a transmitting apparatus.

FIG. 2 is a configuration view of a monitor system for which the present invention has not been packaged.

This monitor system is configured of a transmitting apparatus 100 and a control terminal 200.

The control terminal 200 has dedicated software 201 for monitoring the transmitting apparatus 100 installed. For example, a power source, a wavelength multiplexer, a transmitting/receiving section, a transmission route, etc. are an object of monitor. A command for monitoring sections to be monitored is transmitted to the transmitting apparatus 100 by employing this dedicated software 201.

The transmitting apparatus 100 has a converter 101 and an executor 102. Also, in addition hereto, the transmitting apparatus 100 has a power source, a wavelength multiplexer, a transmitting/receiving section, a transmission route, etc, being sections to be monitored, which are not shown in the figure. The transmitting apparatus 100 converts the command from the control terminal 200 into a command for an internal process in the converter 101, and transmits it to the executor 102. And, the executor 102 executes this converted command.

In such a manner, in the configuration in which no file system is installed in the transmitting apparatus 100, as mentioned above, it is difficult to package the WEB server faculty in the transmitting apparatus 100, so the configuration of the transmitting apparatus 100 is changed.

Figure 3:
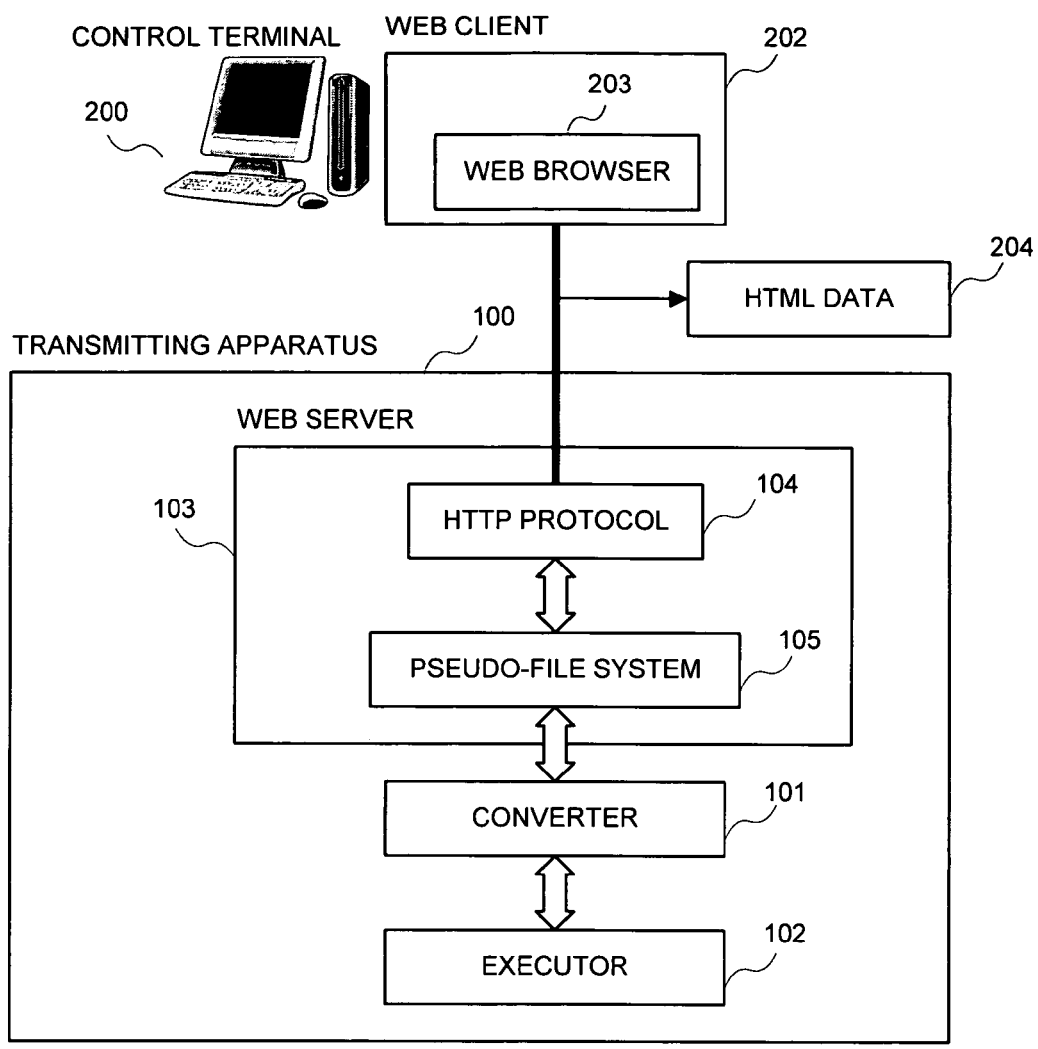
FIG. 3 is a conceptual view illustrating a relation between a WEB browser and a WEB server.

FIG. 3 is a configuration view of the monitor system of the present invention.

The monitor system in the present invention is configured of the transmitting apparatus 100 and the control terminal 200. The transmitting apparatus 100 and the control terminal 200 are connected via a network. It is also acceptable that this network is a LAN (Local Area Network); however herein, it is assumed to be an internet.

The control terminal 200 is a PC having a network faculty. Accordingly, the control terminal 200 has a CPU, an OS, etc. installed, which are a general-purpose component of the PC. Also, an operational section such as a display and a keyboard is connected to the control terminal 200. Moreover, a WEB browser 203 is installed in the control terminal 200 as a WEB client 202. This WEB browser 203, which is not special software, is software to be installed in the standard PC. Additionally, the display is acceptable as far as it can display data.

The WEB browser 203 causes the display to display various WEB pages for monitoring and controlling the transmitting apparatus 100. And, a user monitors the transmitting apparatus 100 through this WEB page, and causes the display to display monitor information for control. In causing the display to display the WEB page, HTML (Hyper Text Markup Language) data 204 is transmitted. This HTML data, which is for requesting transmission of an HTML file, data, etc. configuring the WEB page, is comprised of an HTTP header, a file name, and a file pass name. Additionally, in this embodiment, the HTML is employed for explanation; however it is not limited hereto, and for example, an XML (Extensible Markup Language) etc. is also acceptable.

The transmitting apparatus 100, which has a wavelength multiplexer, a transmitting/receiving section, a transmission route, etc, is, for example, a basic transmitting apparatus for making optical multiplex communication etc. Moreover, the transmitting apparatus 100 has the converter 101, the executor 102, and a WEB server 103.

The WEB server 103 is configured of an HTTP protocol 104 and a pseudo-file system 105.

The HTTP protocol 104 determines whether or not transmitted data from the control terminal 200 is the HTML data 204. In a case where it has been determined that the transmitted data is not the HTML data, the HTTP protocol 104 transfers the transmitted data to the converter 101. On the other hand, in a case where it has been determined that the transmitted data is the HTML data 204, the HTTP protocol 104 fetches only the HTTP header having size etc. of the file written from the HTML data, and transfers the HTML data from which the HTTP header has been fetched to the pseudo-file system 105. The fetched HTTP header is retained in the HTTP protocol 104.

Also, the HTTP protocol 104 calculates size of a response file to be transferred from the pseudo-file system 105, and adds the HTTP header having this size described hereto, and transmits it the control terminal 200.

The pseudo-file system 105 has two databases. One is an HTML file table in which the HTML file and the command are configured correspondingly, as shown in FIG. 4. The HTML file is a file for configuring the WEB page that the WEB browser 203 causes the display to display. The command includes various monitor commands for, responding to a necessity, monitoring the sections to be monitored, various control commands for taking a control, or collection commands for collecting various monitor results that the executor 102 monitors at any time.

The other one is an HTML index in which the HTML file name, the HTML file pass name, and the HTML file pointer are configured correspondingly, as shown in FIG. 5. The HTML file pointer, which is one for indicating a location having the HTML file filed, is, for example, an address.

Moreover, the pseudo-file system 105 analyzes the HTML data from the HTTP protocol 104, and extracts an HTML file name and a pass name of this HTML file. Moreover, the pseudo-file system 105 compares this extracted HTML file name and pass name with each record of the HTML index, thereby to retrieve the record having the extracted HTML file name and pass name described, and fetches a pointer that corresponds hereto. It fetches an HTML file from the HTML file table based upon this fetched pointer. Moreover, the pseudo-file system 105 determines whether this HTML file is a fixed file or a variable file. If it is a fixed file, it transfers the fetched HTML file to the HTTP protocol 104. If it is a variable file, it issues a corresponding command to the converter 101.

Also, as a result of executing the command, the pseudo-file system 105 adds the monitor information to be transmitted from the converter 101 to the retrieved HTML file, and compiles a response HTML file.

The converter 101 converts the command from the pseudo-file system 105 into an internal command that is a command for an internal process. For example, in a case where the command is a command for transmitting the monitor information at any time, which is a monitor result of monitoring an object of monitor by the executor 102, the converter 101 issues a collection command to the executor 102. In a case where the command is a command for causing the executor 102 to monitor an object of monitor and to transmit the monitor information responding to a necessity, which is a monitor result, the converter 101 issues various monitor commands for monitoring an object of monitor. Also, in a case where the command is a command for controlling an object of monitor to transmit the control result as monitor information, the converter 101 transmits issues various control commands.

The executor 102 monitors an object of monitor, which has to be monitored at any time, and retains its result as monitor information. Also, in a case where the internal command from the converter 101 is a collection command, the executor 102 transmits the retained monitor information to converter 101 for converting into an internal command. In a case where the internal command is a monitor command, the executor 102 monitors an object of monitor responding to its command, and transmits the monitor information to converter 101 for converting into an internal command. In a case where the internal command is a control command, the executor 102 controls each section of the transmitting apparatus responding to the command, and transmits the control result as monitor information to the executor 101.

Figure 6:
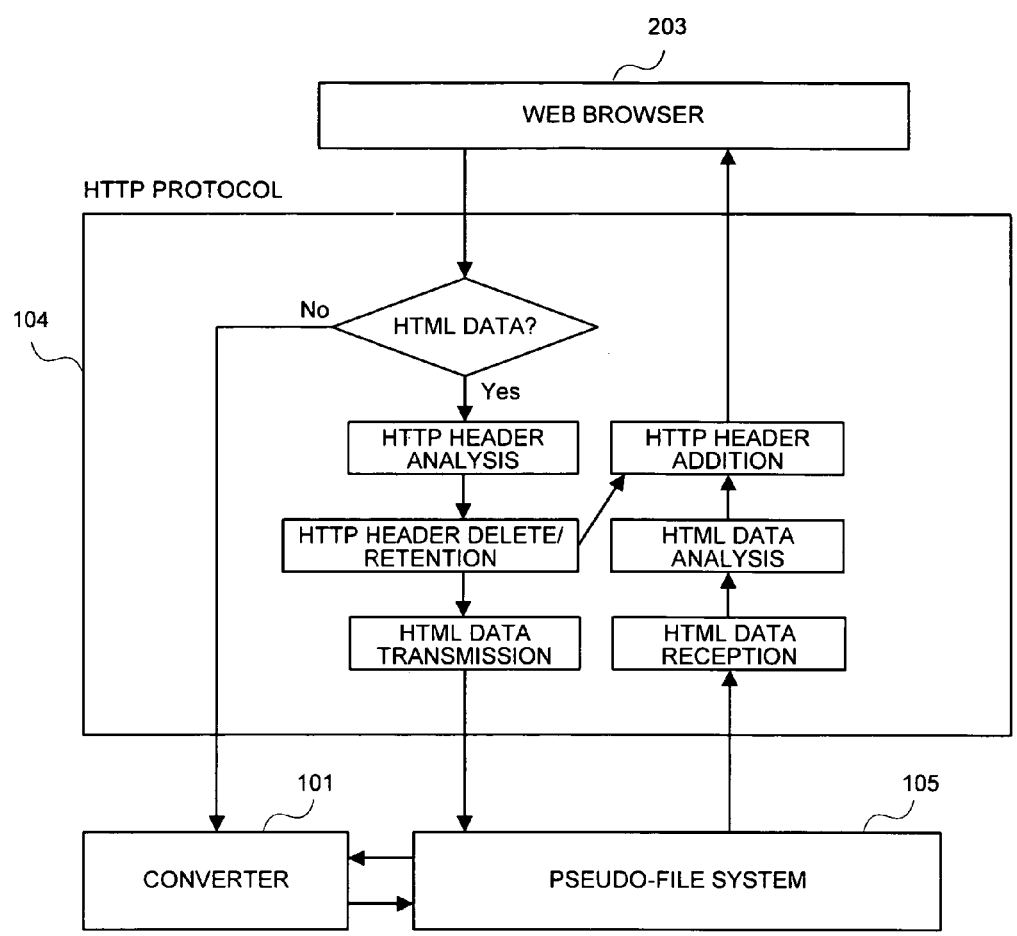
FIG. 6 is a sequence flowchart in an HTTP protocol.
Figure 7:
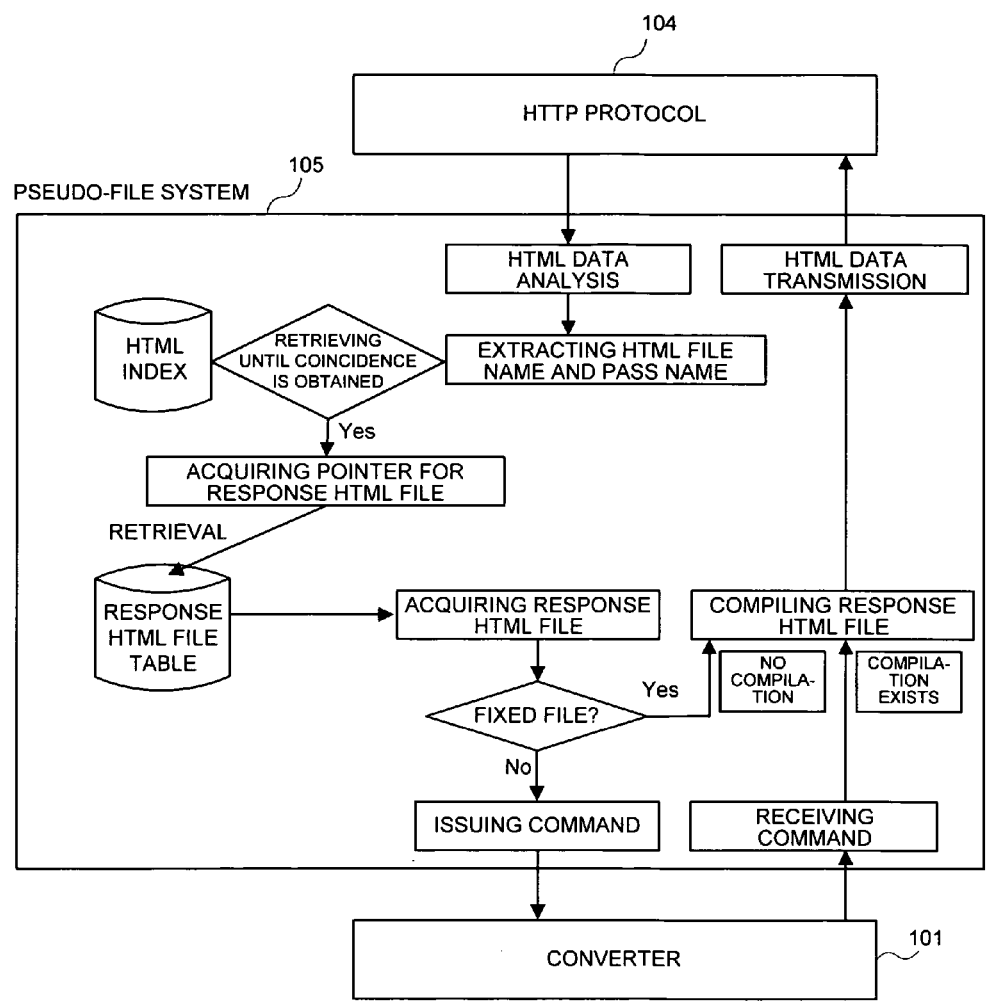
FIG. 7 is a flowchart of a pseudo-file system.

Continuously, an operation of this embodiment will be explained in details employing FIG. 6 and FIG. 7.

At first, the HTTP protocol 104 determines whether or not the transmitted data is the HTML data 204. In a case where it has been determined that the transmitted data is not the HTML data 204, the HTTP protocol 104 transfers its data to the converter 101.

On the other hand, in a case where it has been determined that the transmitted data is the HTML data 204, the HTTP protocol 104 analyzes the HTTP header of the HTML data, and fetches the HTTP header. And, it retains the HTTP header.

The HTML data from which the HTTP header has been fetched is transferred to the pseudo-file system 105.

The pseudo-file system 105 analyzes the HTML data from the HTTP protocol 104, and extracts the HTML file name and the pass name. It compares each of the records of the HTML index with the other based upon this extracted HTML file name and pass name, and retrieves the record that coincides therein.

When the record that coincides in the HTML file name and pass name is retrieved, the pseudo-file system 105 acquires a pointer of the HTML file from its record. The pseudo-file system 105 acquires an HTML file from the response HTML file table by employing the acquired pointer of the HTML file. If this HTML file is a fixed file, there is no necessity for adding data hereto, so the pseudo-file system 105 transmits the HTML file to the HTTP protocol 104 as the response HTML file as it stands. On the other hand, the HTML file is a variable file, the pseudo-file system 105 issues a correspondingly stored command to the converter 101.

The converter 101 converts the command from the pseudo-file system 105 into an internal command, thereby to transmit it to the executor 102.

The executor 102 receives the command from the converter 101, and executes the command, thereby to acquire monitor information. And, it transmits the acquired monitor information to the pseudo-file system 105.

The pseudo-file system 105 adds the monitor information from the executor 102 to the retrieved HTML file for compilation, and transmits it as the response HTML file to the HTTP protocol 104.

The HTTP protocol 104 analyzes the response HTML file from the pseudo-file system 105, and calculates size. It adds the HTTP header having this size described to the response HTML file, and transmits it to the WEB browser 203, No file system exists as a this-time scheme, whereby the HTML file cannot be generated dynamically. For this, a configuration is assumed in which each HTML file is beforehand secured on the response HTML file table in a fixed manner, and the HTML index is employed for management based upon the pointer of each HTML file thereof. Also, This configuration makes it possible to reduce a preparation time required until the response HTML file is prepared as compared with the dynamic HTML file because the HTML file is managed in a fixed manner.

Next, a second embodiment in the present invention will be explained. In the above-described embodiment, the configuration has been explained in which the HTML index has the HTML file name, the pass name and the pointer stored correspondingly. In this embodiment, a configuration will be explained in which an HTML index table having the HTML file name, the pass name, the command, and the pointer stored correspondingly is employed instead of the HTML index. Additionally, in this embodiment, identical codes are affixed to components identical to that of the above-described embodiment, and only different components are explained.

Figure 8:
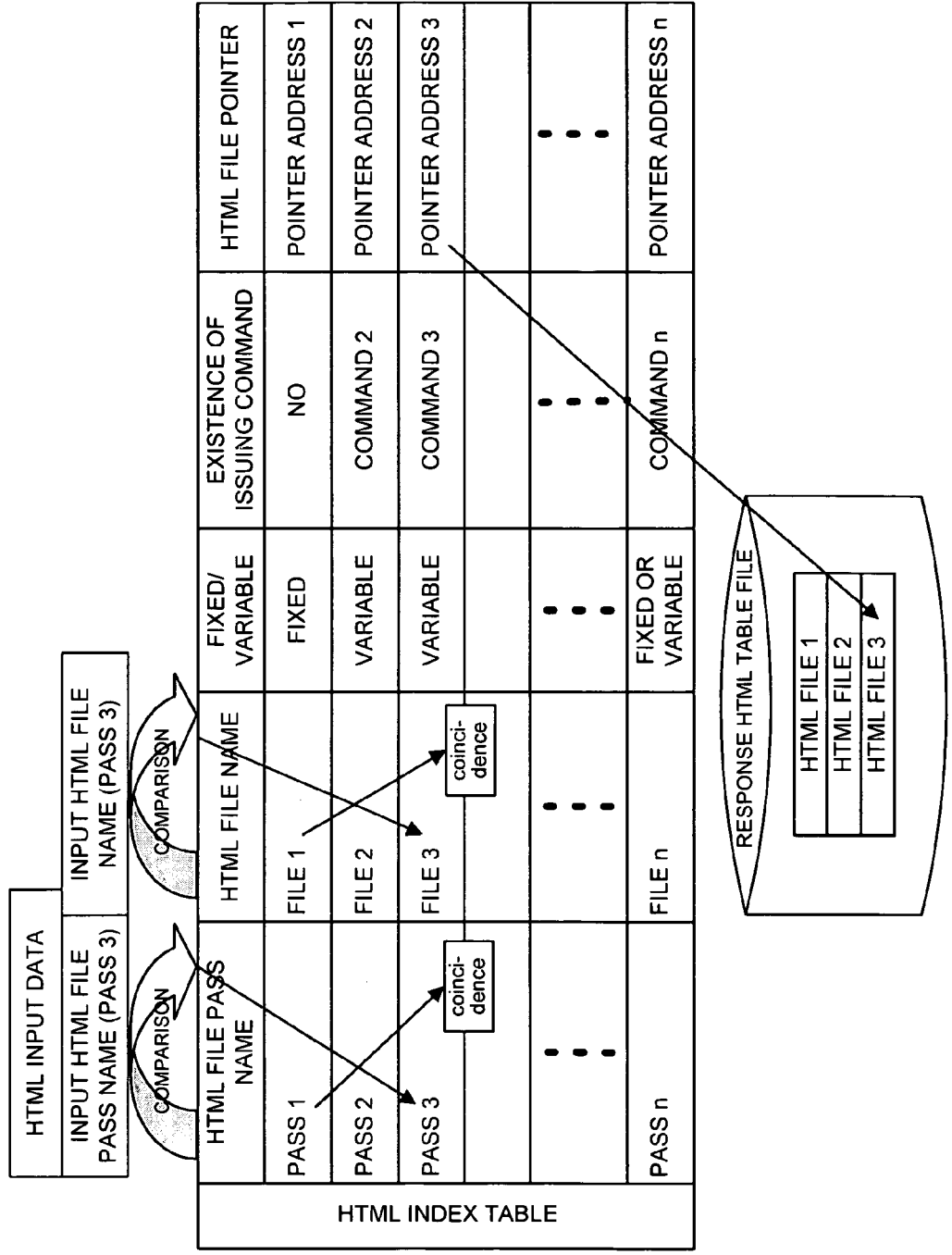
FIG. 8 is a view illustrating an HTML index table retrieving process.

The pseudo-file system 105 has an HTML index table as shown in FIG. 8. The HTML index table has the HTML file name, the pass name, the command, and the pointer stored correspondingly.

Continuously, an operation in this embodiment will be explained. Additionally, only an operation different from that of the above-described embodiment will be explained.

The pseudo-file system 105 analyzes the HTML data from the HTTP protocol 104, and extracts an input file pass name and an HTML file name from the HTML data. The pseudo-file system 105 compares this extracted input file pass name and HTML file name with the HTML file pass name and HTML file name of each table of the HTML index table respectively, and retrieves them until coincidence is obtained. As shown in FIG. 8, because of coinciding in a pass 3 and a file 3, the HTML file is acquired based upon an HTML file point address 3 of its record.

Assuming such a configuration allows a faculty identical to the file system to be supported. Also, by employing the HTML index table as a retrieving process, an improvement in a performance of command response to the WEB browser is enabled because a high-speed retrieval is possible.

A third embodiment of the present invention will be explained.

As apparent from the above-mentioned explanation, the transmitting apparatus 100 and the control terminal 200 in the present invention can be configured with hardware; however it is also possible to realize it with software (computer program).

Figure 9:
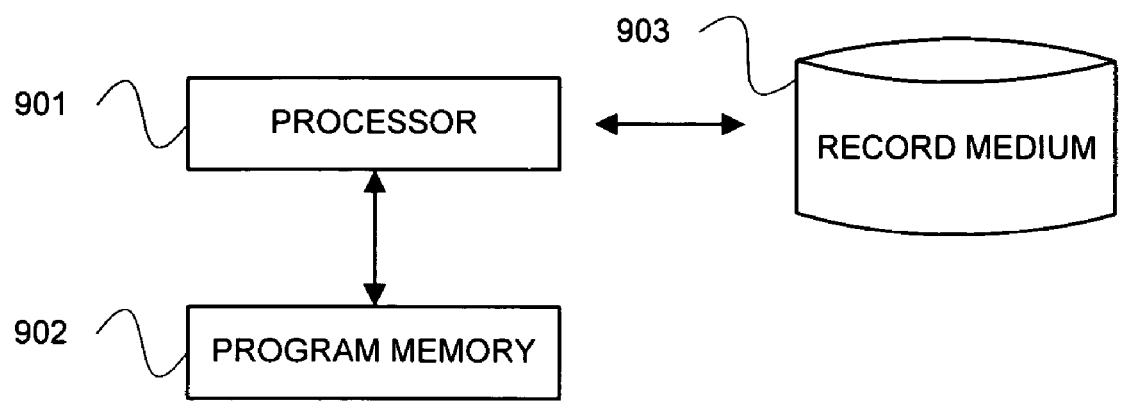
FIG. 9 is a configuration view for explaining a third embodiment.

FIG. 9 is a general configuration view of an information processing unit having the transmitting apparatus 100 and the control terminal 200 according to the present invention implemented.

The information processing unit shown in FIG. 9 is comprised of a processor 901, a program memory 902, and a storage medium 903.

In the transmitting apparatus 100, the entire faculty or the partial faculty of the converter 101, the executor 102, and the WEB server 103 is processed based upon the program filed in the program memory 902. Each piece of information is stored in the storage medium 903.

Also, in the control terminal 200, the faculty of the WEB browser 203 is processed based upon the program filed in the program memory 902.

In such a manner, the processor for operating each process section with the program, the memory in which information is stored, and the storage medium make it possible to realize the faculty and the operation similar to that of the above-described embodiment.

In accordance with the present invention, configuring the pseudo-file system in the apparatus having no file system packaged enables the WEB server faculty to be packaged. In particular, in the transmitting apparatus in which embedded S/W (software) is packaged, the file system is not packaged because of taking a write performance of backup data into consideration. Accordingly, the case where the WEB server faculty is packaged in the transmitting apparatus in which the embedded S/W is packaged is effective.

Also, in accordance with the present invention, the HTML index is employed to retrieve the HTML file table, whereby the higher-speed retrieval is possible as compared with the case of packaging the file system. This reason is that with the file system, an overhead of the retrieval process is large because of making a retrieval with a pointer chain until an object file is retrieved from a FAT (File Allocation Tables) region.

Moreover, in accordance with the present invention, the HTTP corresponds so that the WEB server management is enabled by employing the pseudo-file system, whereby the monitor employing the WEB client is enabled also from the monitor apparatus employing the dedicated application, which is currently used.

What is claimed is:

1. A monitor system for a transmitting apparatus retaining no file system and a terminal monitoring this transmitting apparatus, wherein said terminal has a controller for requesting transfer of a file for displaying monitor information, transmitting a transfer request, and causing monitor information transmitted responding to this transfer request to be displayed, said transfer request being comprised of a file name and a file pass name of its file, and wherein said transmitting apparatus has:

a retriever for retrieving a pointer indicating a location having this file filed, based upon the file name and the file pass name of the transfer request transmitted from said terminal, retrieving a file based upon the retrieved pointer, and issuing a command that corresponds to this retrieved file;

an executor for executing said issued command, thereby to acquire monitor information; and a transmitter for inserting said acquired monitor information into said retrieved file, thereby to generate a file, and transmitting it, wherein said retriever retrieves said command from an index table having said file name, said file pass name, said pointer, and said command stored correspondingly.

2. A transmitting apparatus retaining no file system, said transmitting apparatus having:

a retriever for, based upon a file name and a file pass name of a transfer request for requesting transfer of a file for displaying monitor information, retrieving a pointer indicating a location having this file filed, retrieving a corresponding file based upon the retrieved pointer, and issuing a command that corresponds to this retrieved file;

an executor for executing said issued command, thereby to acquire monitor information; and a transmitter for inserting said acquired monitor information into said retrieved file, thereby to generate a file, and transmitting it, wherein said retriever retrieves said command from an index table having said file name, said file pass name, said pointer, and said command stored correspondingly.

3. A monitor method for a monitor system comprised of a transmitting apparatus retaining no file system and a terminal monitoring this transmitting apparatus, said monitor method having:

a transfer request transmitting step of, for requesting transfer of a file for displaying monitor information of said transmitting apparatus, transmitting a transfer request, said transfer request being comprised of a file name and a file pass name of its file;

a pointer retrieving step of, based upon the file name and the file pass name of said transmitted transfer request, retrieving a pointer indicating a location having this file filed;

a file retrieving step of retrieving a file based upon said retrieved pointer;

an issuing step of issuing a command that corresponds to said retrieved file;

an executing step of executing said issued command by using an executor, thereby to acquire monitor information; and a transmitting step of inserting said acquired monitor information into said retrieved file, thereby to generate a file, and transmitting it;

wherein said pointer retrieving step is a step of retrieving said command from an index table having said file name, said file pass name, said pointer, and said command stored correspondingly.

4. A monitor method for monitoring a transmitting apparatus retaining no file system, said monitor method having:

a retrieving step of, based upon a file name and a file pass name of a transfer request for requesting transfer of a file for displaying monitor information of said transmitting apparatus, retrieving a pointer indicating a location having this file filed, retrieving a corresponding file based upon the retrieved pointer, and issuing a command that corresponds to this retrieved file;

an executing step of executing said issued command by using an executor, thereby to acquire monitor information; and a transmitting step of inserting said acquired monitor information into said retrieved file, thereby to generate a file, and transmitting it, wherein said retrieving step is a step of retrieving said command from an index table having said file name, said file pass name, said pointer, and said command stored correspondingly.

* * * * *